Patented July 14, 1942

2,289,757

UNITED STATES PATENT OFFICE 2,289,757

CRACKING OILS WITH CATALYSTS

Gerald C. Connolly, Baton Rouge, La., assignor to Standard Oil Development Company, a corporation of Delaware No Drawing. Application May 16, 1939,
Serial No. 273,886

7 Claims. (Cl. 196—52)

This invention relates to the use of the conversion of hydrocarbon oils and pertains more particularly to a catalyst for cracking oils.

It has heretofore been proposed to crack hydrocarbon oils by passing the oil in contact with a catalyst at suitable temperatures whereby the oil molecules are broken to form lower molecular weight products. Such operations are of particular value for production of motor fuel from higher boiling hydrocarbons.

The type of catalyst most commonly employed heretofore for this service comprised hydrosilicates of alumina either in the form of naturally active or activated clays.

The general object of the present invention is to use a catalyst for the conversion of hydrocarbon oils and particularly for cracking oils which is of a different type than those heretofore used.

A further object of the invention is to use a catalyst for catalytic cracking which will reduce the amount of carbonaceous deposits retained on the catalyst for any given percentage conversion into motor fuel.

I have discovered that a catalyst comprising beryllium oxide when combined with either silica or alumina under such conditions as to form an adsorptive structure is an efficient cracking catalyst. I have further found that one of the important properties of this type of catalyst is that it results in deposition of less carbonaceous deposits for a given conversion than catalysts of the types heretofore employed.

When it is considered that the accumulation of carbonaceous deposits on the catalyst tends to reduce the activity and requires periodic regeneration of the catalyst mass to remove such deposits, it will be appreciated that the coke producing properties of a catalyst is an important practical consideration. For example, by reducing the amount of coke formed for a given yield of motor fuel the length of the cracking cycle may be extended or the length of the regenerating cycle may be reduced. While the amount of coky deposits formed per unit time will vary with the amount of gasoline produced for any given catalyst, the relative amount of coky deposits formed in the production of a given volume of gasoline will also vary with the type of catalyst used.

I have found that catalyst containing beryllium oxide produces a relatively low ratio of coke to gasoline.

The beryllia-alumina catalyst or beryllia-silica catalyst may be prepared in a number of ways capable of producing an adsorptive structure.

One method which has been found particularly effective is to impregnate silica or alumina in hydrous state such as in the form of hydrogel or wet gelatinous precipitate with a beryllium salt solution capable of being converted to the oxide either by heat, by chemical means or the like. The resulting impregnated product may then be dried under controlled conditions to avoid destroying the gel structure and the beryllium salt then converted to the oxide.

The term "hydrous state" as herein employed is intended to mean that it contains a relatively large volume of imbibed water not chemically combined therewith. For example in the production of silica gel a sodium silicate solution is usually reacted with an acid under condition controlled with respect acidity of the reaction solution to form a relatively clear colloidal solution known as silica hydrosol. The hydrosol upon standing normally sets into a firm jelly in which is imbibed all of the water of the solution. Such a hydrogel after being broken up and washed free of reaction salts may for example be impregnated with beryllium nitrate and then dried and decomposed.

When the sodium silicate is combined with the acid under less carefully controlled conditions part or all of the silica may precipitate in the form of a gelatinous mass containing a relatively large amount of imbibed water. Either the gelatinous mass or the true hydrogel may be impregnated with the beryllium salt solution.

Another convenient method of preparing the catalyst is to add the beryllium oxide as such or in the form of a decomposable salt during the formation of the hydrosol or before the hydrosol has set into the hydrogel.

Or, if desired the beryllium oxide may be mechanically mixed with the silica or alumina preferably while the latter two are in hydrous state such as in the form of a hydrogel or gelatinous precipitate.

It will be understood that the invention in its broader phases is not restricted to the use of a catalyst made by any particular method of combining the ingredients.

The relative proportions of beryllium oxide and silica or alumina as the case may be can vary over a relatively wide range without seriously impairing the efficiency of the catalyst. For example catalyst having a beryllium oxide content of from about 5% to 50% can be employed. It is preferred however to have the beryllium oxide content between 5% and 20%.

While the catalyst consists essentially of silica or alumina and beryllium oxide, the invention of using it does not preclude the addition of other constituents in minor amounts.

As a guide to a better understanding of invention the following examples may prove helpful, it being understood that the values there given are illustrative rather than limitive.

*Example I*

A wet gelatinous alumina, was first prepared by combining a 10% solution of aluminum sulphate $(Al_2(SO_4)_3.18H_2O)$ with a normal solution of ammonium hydroxide, until the latter was in slight excess.

The resulting highly gelatinous alumina after being washed free of reaction impurities was mixed with a solution of beryllium nitrate of a concentration such that the resulting dried and decomposed product contained between 10% and 15% beryllium oxide. The resulting product after thorough mixing was allowed to stand overnight, during which period the mass jelled to a considerable extent indicating the peptizing effect of the beryllium nitrate. The mass after being slowly dried formed particles having a smooth glassy appearance which curled slightly. The particles were then heated at 800° F. for a period of 4 hours during which time the nitrate was decomposed to the oxide. The resulting product was then formed into pills of about 5 millimeters in diameter and 6 millimeters in length.

These pills were then placed in a reactor and preheated virgin east Texas gas oil of 33.8 A. P. I. gravity in vapor form was passed through the reactor at a rate of .6 volume of liquid feed per volume of catalyst per hour.

The reaction zone was maintained at a temperature of 850° F. and the length of cracking cycle was two hours. The average conversion into unstabilized 400° F. end point gasoline over the two hour period amounted to 25% whereas the amount of coke formed on the catalyst amounted to .42% of the fresh feed.

*Example II*

A washed silica hydrogel (the dry gel of which had an apparent density of .60) prepared in the conventional manner was soaked with a solution of beryllium nitrate of a concentration such that the final dried and decomposed product had a beryllium oxide content of 10%. After thorough soaking the product was drained, slowly dried, activated and pilled as described in Example I. This product when tested under the same conditions as in Example I produced an average conversion of 29% over the two hour period and the amount of coke formed amounted to .56% of the feed. Having thus described the invention it is understood that it embraces such other variations and modifications as come within the spirit and scope thereof.

I claim:

1. A method of cracking hydrocarbon oils to form lower boiling hydrocarbons boiling within the gasoline boiling range which comprises passing the oil in contact with a gel catalyst, consisting principally of beryllium oxide and alumina, within a cracking zone, maintaining said zone at cracking temperature and keeping said oil in contact with said catalyst for a period sufficient to materially crack said oil.

2. The method defined in claim 1 in which the beryllium oxide and alumina is combined while the latter is in hydrous state.

3. The method defined in claim 1 wherein the adsorptive constituent is alumina gel.

4. In the method defined by claim 1, the further improvement which comprises contacting the oil with a catalyst consisting principally of beryllia and alumina wherein the beryllia content is between 5 and 50% on a dry basis.

5. In the method defined in claim 1, the further improvement which comprises contacting the oil with a catalyst consisting principally of beryllium oxide and alumina, wherein the beryllium oxide content of the catalyst is between 5 and 20% on a dry basis.

6. In the method defined in claim 1, the further improvement which comprises contacting the oil to be cracked with a catalyst consisting principally of beryllium oxide and alumina, wherein the beryllium oxide content is about 10%.

7. A method of cracking hydrocarbon oils which comprises passing the oil to be cracked while in vapor form in contact with a catalyst consisting principally of beryllium oxide and alumina having a beryllium oxide content between 5 and 50% formed by impregnating a wet gelatinous precipitate of alumina with a solution containing a decomposable salt of beryllium and thereafter drying and decomposing the salt into beryllium oxide, maintaining said oil in contact with said catalyst while at cracking temperature for a period sufficient to crack a substantial portion of said oil into lower boiling products.

GERALD C. CONNOLLY.